(12) United States Patent
Fogarty et al.

(10) Patent No.: US 9,182,981 B2
(45) Date of Patent: Nov. 10, 2015

(54) SYSTEMS AND METHODS FOR IMPLEMENTING PIXEL-BASED REVERSE ENGINEERING OF INTERFACE STRUCTURE

(75) Inventors: James Fogarty, Seattle, WA (US); Morgan Dixon, Seattle, WA (US); Daniel Leventhal, Seattle, WA (US)

(73) Assignee: University of Washington, Seattle, WA (US)

( * ) Notice: Subject to any disclaimer, the term of this patent is extended or adjusted under 35 U.S.C. 154(b) by 686 days.

(21) Appl. No.: 12/953,257

(22) Filed: Nov. 23, 2010

(65) Prior Publication Data

US 2011/0126158 A1    May 26, 2011

Related U.S. Application Data

(60) Provisional application No. 61/263,747, filed on Nov. 23, 2009, provisional application No. 61/317,152, filed on Mar. 24, 2010.

(51) Int. Cl.
| | |
|---|---|
| *G06F 3/00* | (2006.01) |
| *G06F 9/44* | (2006.01) |
| *G06F 3/0481* | (2013.01) |
| *G06K 9/32* | (2006.01) |

(52) U.S. Cl.
CPC .............. *G06F 8/75* (2013.01); *G06F 3/0481* (2013.01); *G06F 9/4443* (2013.01); *G06K 9/325* (2013.01)

(58) Field of Classification Search
CPC .......... G06F 9/44; G06F 3/0481; G06F 3/048
USPC ................................................. 715/762–763
See application file for complete search history.

(56) References Cited

U.S. PATENT DOCUMENTS

| | | | | |
|---|---|---|---|---|
| 6,339,776 | B2 * | 1/2002 | Dayani-Fard et al. | 1/1 |
| 6,536,018 | B1 * | 3/2003 | Chisholm et al. | 716/136 |
| 6,662,237 | B1 * | 12/2003 | Leckie | 719/320 |
| 7,814,404 | B2 * | 10/2010 | Shenfield | 715/200 |
| 8,239,882 | B2 * | 8/2012 | Dhanjal et al. | 719/319 |
| 2003/0058277 | A1 * | 3/2003 | Bowman-Amuah | 345/765 |
| 2004/0148588 | A1 * | 7/2004 | Sadiq | 717/109 |

(Continued)

OTHER PUBLICATIONS

Memon et al, GUI Ripiing:REverse Engineering of Graphical USer Interfaces for Testing, 2003, pp. 1-10.*

(Continued)

*Primary Examiner* — Ryan Pitaro
(74) *Attorney, Agent, or Firm* — Perkins Coie LLP

(57) ABSTRACT

Systems and methods for implementing real-time pixel-based reverse engineering of interface structures are disclosed herein. The system uses the pixels representing widgets and content of a user interface to analyze, interpret, and/or enhance the interface without requiring cooperation from the interface. The system captures pixel data and reverse engineers the composition and structure of the interface from the captured pixel data. Using the reverse engineered interface, generated based on the captured pixel data, the facility can identify and record user interactions with the interface, modify the display of the interface to meet user requirements, preferences, or customization options, or enhance the interface to provide functionality not otherwise available, etc. The system can perform these processes across a variety of interfaces regardless of their underlying implementation and without any modifications to the interface.

47 Claims, 10 Drawing Sheets

(56) References Cited

U.S. PATENT DOCUMENTS

| | | | |
|---|---|---|---|
| 2004/0172612 A1* | 9/2004 | Kasravi et al. | 717/101 |
| 2004/0213459 A1* | 10/2004 | Ishimaru et al. | 382/191 |
| 2005/0069037 A1* | 3/2005 | Jiang | 375/240.16 |
| 2005/0071777 A1* | 3/2005 | Roessler et al. | 715/810 |
| 2006/0036448 A1* | 2/2006 | Haynie et al. | 705/1 |
| 2008/0134062 A1* | 6/2008 | Bauman et al. | 715/762 |
| 2008/0148235 A1* | 6/2008 | Foresti et al. | 717/123 |
| 2009/0024980 A1* | 1/2009 | Sundararajan et al. | 717/104 |
| 2010/0050152 A1* | 2/2010 | Gilboa | 717/106 |
| 2010/0083094 A1* | 4/2010 | Kerr | 715/234 |
| 2010/0114939 A1* | 5/2010 | Schulman et al. | 707/769 |
| 2011/0078556 A1* | 3/2011 | Prasad et al. | 715/234 |
| 2012/0151433 A1* | 6/2012 | Amodio et al. | 717/105 |

OTHER PUBLICATIONS

Vanderdonckt et al, Flexible Revese Engineering of Web Pages with Vaquista, 2001, pp. 1-8.*

Grossman, T. et al., "The Bubble Cursor: Enhancing Target Acquisition by Dynamic Resizing of the Cursor's Activation Area," CHI 2005, Apr. 2-7, 2005 Portland, Oregon, USA, pp. 281-290.

Hurst A. et al., "Automatically Identifying Targets Users Interact with During Real World Tasks," IUI 2010, Feb. 7-10, 2010, Hong Kong, China, pp. 11-20.

Hurst, A. et al., "Dirty Desktops: Using a Patina of Magnetic Mouse Dust to Make Common Interactor Targets Easier to Select," Proc. of the ACM Symposium on User Software and Technology, UIST 2007, Oct. 7-10, 2007, Newport, Rhode Island, USA, pp. 183-186.

Little, G. et al., "Koala: Capture, Share, Automate, Personalize Business Processes on the Web," CHI 2007, Apr. 28-May 3, 2007, San Jose, CA, USA, pp. 943-946.

Myers, B.A., "Past, Present, and Future of User Interface Software Tools," ACM Transactions on Computer-Human Interaction, vol. 1, No. 1, Mar. 2000, pp. 3-28.

Potter, R., "Triggers: Guiding Automation with Pixel to Achieve Data Access," Cypher, A., Ed., MIP Press, 1993, 21 pages.

Rissanen, J., "Modeling by Shortest Data Description," Automatica, vol. 14, No. 5, © International Federation of Automatic Control Pergamon Press Ltd. 1978, pp. 465-471.

St. Amant, R. et al., "Image Processing in Cognitive Models with SegMan," Proc. of HCII 2005, 10 pages.

St. Amant, R. et al., "Visual Generalization in Programming by Example," Communication of the ACM, Mar. 2000, vol. 43, No. 3, pp. 107-114.

Stuerzlinger, W. et al., "User Interface Facades: Towards Fully Adaptable User Interfaces," Proc. of the 19th Annual ACM Symposium on User Interface Software and Technology, UIST 2006, 9 pages.

Tan, D.S. et al., "WinCuts: Manipulating Arbitrary Window Regions for More Effective Use of Screen Space," CHI 2004, pp. 1525-1528.

Wachenfeld, S. et al., "Recognition of Screen-Rendered Text," ICPR 2006, pp. 1086-1089.

Yeh, T. et al., "Sikuli: Using GUI Screenshots for Search and Automation," UIST 2009, Oct. 4-7, 2009, Victoria, British Columbia, Canada, pp. 183-192.

Zettlemoyer, L. S. et al., "IBOTS: Agent Control Through the User Interface," IUI 1999, Redondo Beach, CA, pp. 31-37.

Zettlemoyer, L. S. et al., "Visual Medium for Programmatic Control of Interactive Application," CHI 1999, pp. 199-206.

Dixon, M. et al., "Prefab: Implementing Advanced Behaviors Using Pixel-Based Reverse Engineering of Interface Structure," CHI 2010, Apr. 10-15, 2010, Atlanta, Georgia, USA, 10 pages.

Baudisch, P., et al.,"Phosphor: Explaining Transitions in the User Interface Using Afterglow Effects," Proceedings of the ACM Symposium on User Interface Software and Technology, UIST 2006, pp. 169-178.

Bolin, M. et al., "Automation and Customization of Rendered Web Pages," UIST 2005, pp. 163-172.

Chang, T.H. et al., "GUI Testing User Computer Vision," CHI 2010, pp. 1535-1544.

Edwards, W.K. et al., "Systematic Output Modification in a 2D User Interface Toolkit," Proceedings of the ACM Symposium on User Interface Software and Technology, UIST 1997, pp. 151-158.

Findlater, L. et al., Ephemeral Adaptation: The Use of Gradual Onset to Improve Menu Selection Performance, CHI 2009, pp. 1655-1664.

Fujima, J. et al., "Clip, Connect, Clone: Combining Applications Elements to Build Custom Interfaces for Information Access," UIST 2004, pp. 175-184.

Gaeremynck, Y. et al., "More for Less: Model Recovery from Visual Interfaces for Multi-Device Application Design," IUI 2003, pp. 69-76.

Greenberg, S. et al., "Usability Evaluation Consider Harmful (Some of the Time)," CHI 2008, pp. 111-120.

Hartmann, B., et al.,"Programming by a Sample: Rapidly Creating Web Applications with d.Mix," Proceedings of the ACM Symposium on User Interface Software and Technology, UIST 2007, pp. 241-250.

Hudson, S.E. et al., "Extensible Input Handling in the subArctic Toolkit," Proceedings of the ACM Conference on Human Factors in Computing Systems, CHI 2005, pp. 381-390.

Hudson, S.E., "Incremental Attribute Evaluation: A Flexible Algorithm for Lazy Update," ACM Transactions on Programming Languages and Systems, TOPLAS 1991, 13(3), pp. 315-341.

Hudson, S.E., et al., "Providing Visually Rich Resizable Images for User Interface Components," Proceedings of the ACM Symposium on User Interface Software and Technology, UIST 2000, pp. 227-235.

Hudson, S.E., et al., "Supporting Dynamic Downloadable Appearances in an Extensible User Interface Toolkit," Proceedings of the ACM Symposium on User Interface Software and Technology, UIST 1997, pp. 159-168.

Hutchings D.R., et al., "mudibo: Multiple Dialog Boxes for Multiple Monitors," Extended Abstracts of the ACM Conference on Human Factors in Computing Systems, CHI 2005, pp. 1471-1474.

Kelleher, C. et al., "Stencils-Based Tutorials: Design and Evaluation," CHI 2005, pp. 541-550.

Lin, J., et al., "End-User Programming of Mashups with Vegemite," IUI 2009, pp. 97-106.

Nichols, J. et al., "Mobilizing by Demonstration: Using Traces to Re-Author Existing Web Sites," IUI 2008, pp. 149-158.

Olsen D.R., et al., "ScreenCrayons: Annotating Anything," Proceedings of the ACM Symposium on User Interface Software and Technology, UIST 2004, pp. 165-174.

Olsen, D.R., "Evaluating User Interface Systems Research," UIST 2007, pp. 251-258.

Olsen, D.R., et al., "Implementing Interface Attachments Based on Surface Representations," Proceedings of the ACM Conference on Human Factors in Computing Systems, CHI 1999, pp. 191-198.

Russell, S. et al., "Artificial Intelligence: A Modern Approach," Prentice Hall, 2003, pp. 94-136.

Takagi, et al., "Social Accessibility: Achieving Accessibility through Collaborative Metadata Authoring," ASSETS 2008, Oct. 13-15, pp. 193-200.

Terry, M. et al., "Side Views: Persistent, On-Demand Previews for Open-Ended Tasks," Proceedings of the ACM Symposium on User Interface Software and Technology, UIST 2002, pp. 71-80.

Wobbrock, J.O., et al., "The Angle Mouse: Target-Agnostic Dynamic Gain Adjustment Based on Angular Deviation," Proceedings of the ACM Conference on Human Factors in Computing Systems, CHI 2009, pp. 1401-1410.

Worden, A., et al., "Making Computers Easier for Older Adults to Use: Area Cursors and Sticky Icons," Proceedings of the ACM Conference on Human Factors in Computing Systems, CHI 1997, pp. 266-271.

* cited by examiner

SYSTEMS AND METHODS FOR IMPLEMENTING PIXEL-BASED REVERSE ENGINEERING OF INTERFACE STRUCTURE

CROSS-REFERENCE TO RELATED APPLICATIONS

This application claims priority to U.S. Provisional Application No. 61/263,747, entitled "IMPLEMENTING ADVANCED BEHAVIORS USING PIXEL-BASED REVERSE ENGINEERING OF INTERFACE STRUCTURE," filed Nov. 23, 2009 and further claims priority to U.S. Provisional Application No. 61/317,152, entitled "IMPLEMENTING ADVANCED BEHAVIORS USING PIXEL-BASED REVERSE ENGINEERING OF INTERFACE STRUCTURE," filed Mar. 24, 2010, each of which is hereby incorporated by reference in their entirety.

BACKGROUND

A graphical user interface (GUI), an alternative to text-based or other user interfaces, allows a user to interact with a computer program through the use of images. A user may interact with a GUI using, for example, a mouse, touch screen, graphics pad, etc. Over time, GUIs have become the primary method through which users interact with computers. Many operating systems (e.g., MICROSOFT WINDOWS, MAC OS X), user applications including productivity software, gaming software, education software, etc., web sites, and so on allow for user interaction through a GUI. GUIs are often implemented using a GUI toolkit, such as the MICROSOFT Foundation Classes, APPLE's Cocoa, Swing, Flash, the X Windows System, etc. These toolkits provide libraries of common frameworks or interactive widgets, such as buttons, context menus, check boxes, drop-down lists, radio buttons, sliders, icons, tooltips, tabs, address bars, windows, dialog boxes, layout managers, and so on. The widgets provide a simple and easy way for the user to interact with the associated software.

GUIs and their associated toolkits are often difficult, if not impossible, to modify or customize by developers or users without access to the underlying code of the interface or toolkit. If a developer wants to add an unsupported widget to a toolkit or customize the graphical representation or behavior of a widget in a manner that is not supported by the toolkit, the developer must integrate the changes into the existing code of the toolkit, which may not be available to the developer. Similarly, the addition of a new widget or functionality to an application requires access to the code of the application and/or cooperation on behalf of the application (i.e., an exposed API or plug-in architecture through which the GUI of the application can be modified or customized in ways envisioned and supported by the developer of the application). Furthermore, because each GUI and toolkit is implemented differently, modifications and customizations can be tedious to implement and integrate into a single GUI or toolkit, let alone every relevant GUI and toolkit.

DETAILED DESCRIPTION

Figure 1:
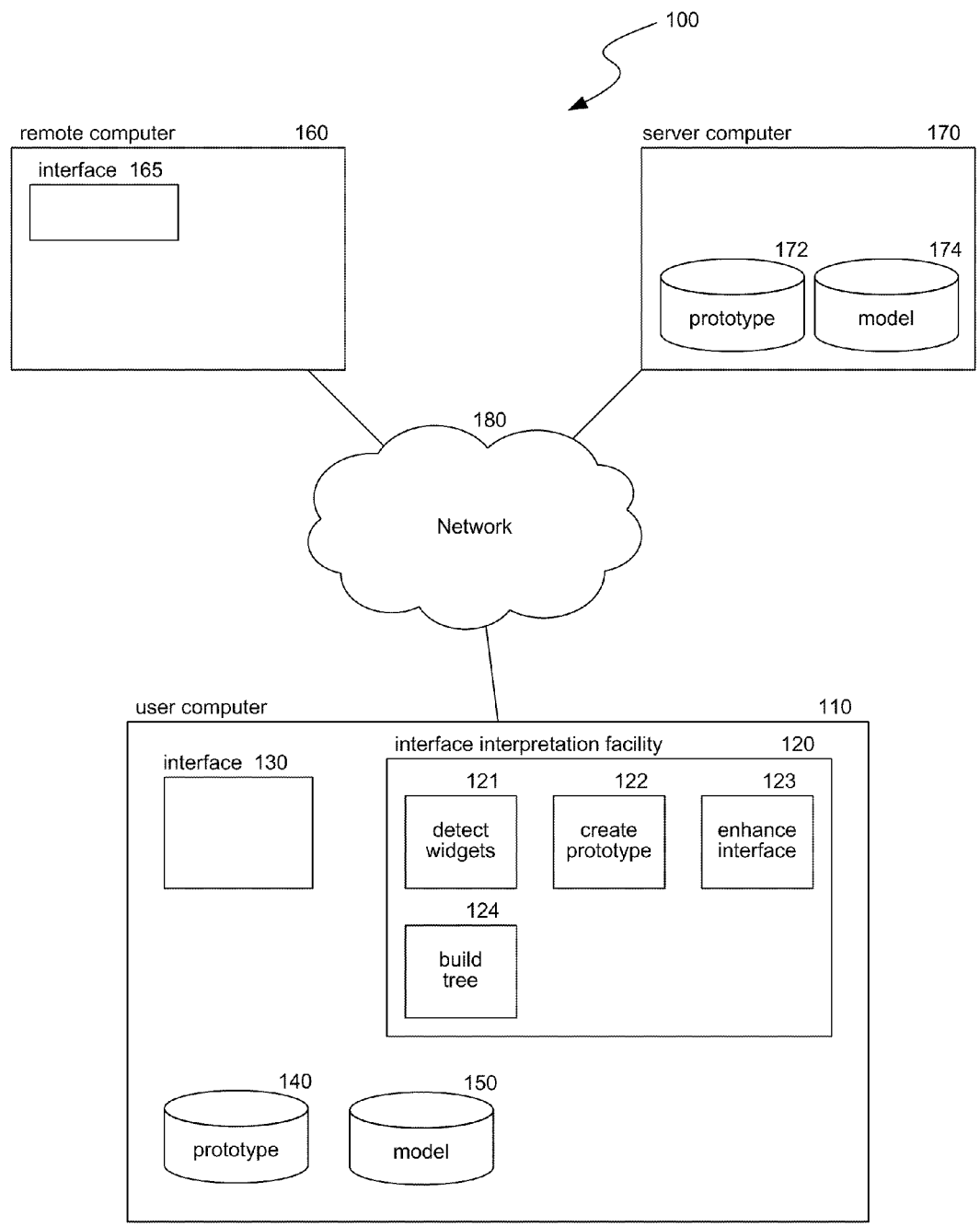
FIG. 1 is a block diagram illustrating an environment in which the facility may operate in some embodiments.

The present disclosure is directed to a facility providing systems and methods for implementing real-time pixel-based reverse engineering of interface structures, such as the structures of a graphical user interface. In some embodiments, the interface interpretation facility uses the pixels representing widgets and content of an interface to analyze, interpret, and/or enhance the interface without requiring cooperation from the interface. The system captures pixel data (e.g., a bitmap image) and reverse engineers the structure and composition of the interface from the captured pixel data. Using the reverse engineered interface, generated based on the captured pixel data, the facility can, for example, identify and record user interactions with the interface, modify the display of the interface to meet user or device requirements (e.g., security or display requirements), preferences (e.g., language translation, or localization), or customization options (e.g., color or widget style choices), enhance the interface to provide functionality not otherwise available or to remove undesired functionality, apply a privacy filter to sensitive information, annotating interfaces, etc. The facility may also enhance the functionality provided by an API associated with the interface. For example, an interface API may provide methods for manipulating a widget of the interface without providing methods for retrieving the graphical representation of the widget. The facility can enhance the API by providing pixel data corresponding to the graphical representation of the widget or a portion thereof. As another example, the facility can expose a widget or capability that the API does not expose, such as providing support for a new type of widget that the API does not support or the ability to disable specific widgets for security or other reasons. Thus, without knowledge of, or access to, the underlying code and libraries associated with the interface, the facility can analyze and interpret the interface and enhance the user's interaction with the interface. By accessing and analyzing pixel data, the facility can perform these processes across a variety of interfaces regardless of their underlying tool kit or implementation and without any modifications to the interface.

In some embodiments, the facility initially captures, in real-time, pixel data corresponding to the interface. For example, the facility may perform a screen capture of an interface or portion thereof or capture interface pixel data rendered off-screen (e.g., to a buffer) prior to the display of the pixel data. The facility can capture the pixel data as a user interacts with a user interface to record, analyze, and/or enhance the user's experience with the interface. The facility may perform its own interactions with or manipulations of the user interface to, for example, construct a widget hierarchy for the interface. As another example, the facility may capture pixel data of an interface from a recording of the interface, such as a user's interaction with the user interface. In this manner, the facility can analyze an interface even though the interface may not be directly accessible to the facility. The facility can later use this information if the interface becomes accessible to the interface or can distribute the information to other computers where the interface might be available.

The facility detects the occurrences of interface widgets within the captured pixel data by scanning the pixel data for particular arrangements of pixels, or "features." For example, the features may represent widget components, such as an arrow of a spinner widget or a thumb of a slider widget. As another example, the features may correspond to pixels that define, in part, the shape of the widget, such as collection of pixels representative of a corner of a button widget.

After identifying the interface features within the pixel data, the facility compares the identified features to widget prototypes of a prototype library. Each widget prototype describes the appearance of at least a portion of a widget as an arrangement of at least one feature. For example, a button prototype may consist of one feature representing all of the pixels on the perimeter of the button or may consist of multiple features, such as one feature representing pixels at each corner of the button. As another example, a combo box prototype may consist of three features, one feature representing an arrow component on one side of the prototype and a feature for each corner on the opposite side of the prototype. The facility may include prototypes that represent widgets in different configurations, such as a disabled button prototype, a currently selected button prototype, an enabled but currently unselected button prototype, and so on. Widget prototypes may also include a specification of an area, or "region," of the prototype that may vary from widget to widget, such as the area between corners of buttons of different lengths. For example, the four feature button prototype described above may include four regions, one region for each edge of the button and defining the color of pixels between the corresponding corner features. In this manner, a single widget prototype can be used identify rectangular buttons regardless of their size. By detecting widgets within pixel data, the facility can generate an interface widget tree to represent the structure and layout of the interface represented in the pixel data. The facility can analyze and alter the tree to monitor and maintain the state of the interface or pass the tree to an interface generation agent to recreate the interface.

FIG. 1 is a block diagram illustrating an environment 100 in which the facility may operate in some embodiments. In this example, the environment includes user computer 110, remote computer 160, server computer 170, and network 180. User computer 110 includes interface interpretation facility 120, interface 130, prototype store 140, and model store 150. Interface interpretation facility 120 provides systems and methods for implementing pixel-based reverse engineering of interface structures.

The facility includes detect widgets component 121, create prototype component 122, enhance interface component 123, and build tree component 124. Detect widget component 121 detects widgets within pixel data provided to the component, such as image data corresponding to a desktop, a specific window on the desktop, a dialog box, and so on. Create prototype component 122 generates widget prototypes that the facility uses to identify widgets within pixel data. Enhance interface component 123 modifies captured interface pixel data to provide features and functionality that the interface itself does not provide. Build tree component 124 builds an interface tree comprising separate nodes for interface elements within the captured pixel data. Interface 130 includes any graphical interface having pixel data that is accessible via the user computer, such as an interface provided by an operating system, an application, a web page, a multimedia player, or any other process, a video recording of an interface, an archive, database, or directory storing a collection of images of an interface. The user interface may be remote to the user computer and accessed via a network or another connection.

Prototype store 140 stores widget prototypes. Each widget prototype specifies an arrangement of one or more features and regions. For example, a prototype for a button may specify a color and position for each of a plurality of pixels at each corner of a button. The prototype store may store prototypes for widgets of multiple interfaces as different prototype libraries (e.g., MICROSOFT WINDOWS 7, MICROSOFT WINDOWS CLASSIC, APPLE MAC OS X). Widget prototypes may be created by end users, interface developers, application developers, and so on. In some cases, an interface provider may provide widget prototypes with an interface or provide widget prototypes for download.

Model store 150 stores a library of widget models. Each widget model specifies at least one constraint to be imposed on a widget prototype, such as overall shape, distance between features and regions, height, width, and shape of features, height, width, and shape of patterns associated with regions, etc., without specifying an arrangement of pixels for the features and/or regions. For example, a model may specify that a widget consists of four features arranged in a rectangle that each of the features consists of a four-by-four square of pixels. A model may also specify the order in which captured pixel data is assigned to features and regions of a widget prototype associated with the model.

Remote computer 160 includes interface 165 which may be accessible to the facility over network 180 via a remote connection or desktop virtualization software. The facility can capture pixel data of interface 165 in order to analyze and interpret the interface. Furthermore, the facility may provide enhancements to interface 165. In this manner, the facility can analyze, interpret, and enhance a user's experience with an interface regardless of the platform, operating system, application, or process that provides the interface.

Server computer 170 includes prototype store 172 configured to store a library of widget prototypes accessible to the facility. For example, prototype store 172 may act as a repository from which users can download updated widget prototypes, new widget prototypes (e.g., widget prototypes corresponding to a new version of MICROSOFT WINDOWS, APPLE OS X, LINUX, MICROSOFT WORD, or MOZILLA FIREFOX), widget prototypes for different interface themes or skins, etc. Prototype store 172 may be supplied and updated by a system administrator or by users through a collaborative environment or exchange of user-provided content. Similarly, server computer 170 includes model store 174, which may act as a repository for widget models accessible by other computers. User computer 110, remote computer 160, and server computer 170 may be connected via network 180. In some embodiments, the environment may include multiple user computers 110, remote computers 160, and/or server computers 170.

The computing devices on which the facility is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the facility, which means a computer-readable medium that contains the instructions. In addition, the instructions, data structures, and message structures may be stored in a data storage medium or transmitted via a data transmission medium, such as a signal on a communication link and may be encrypted. Various communication links may be used, such as the Internet, a local area network, a wide area network, a point-to-point dial-up connection, a cell phone network, and so on.

Embodiments of the facility may be implemented in and used with various operating environments that include personal computers, server computers, handheld or laptop devices, multiprocessor systems, microprocessor-based systems, virtualized computers, programmable consumer electronics, digital cameras, network PCs, minicomputers, mainframe computers, computing environments that include any of the above systems or devices, and so on.

The facility may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
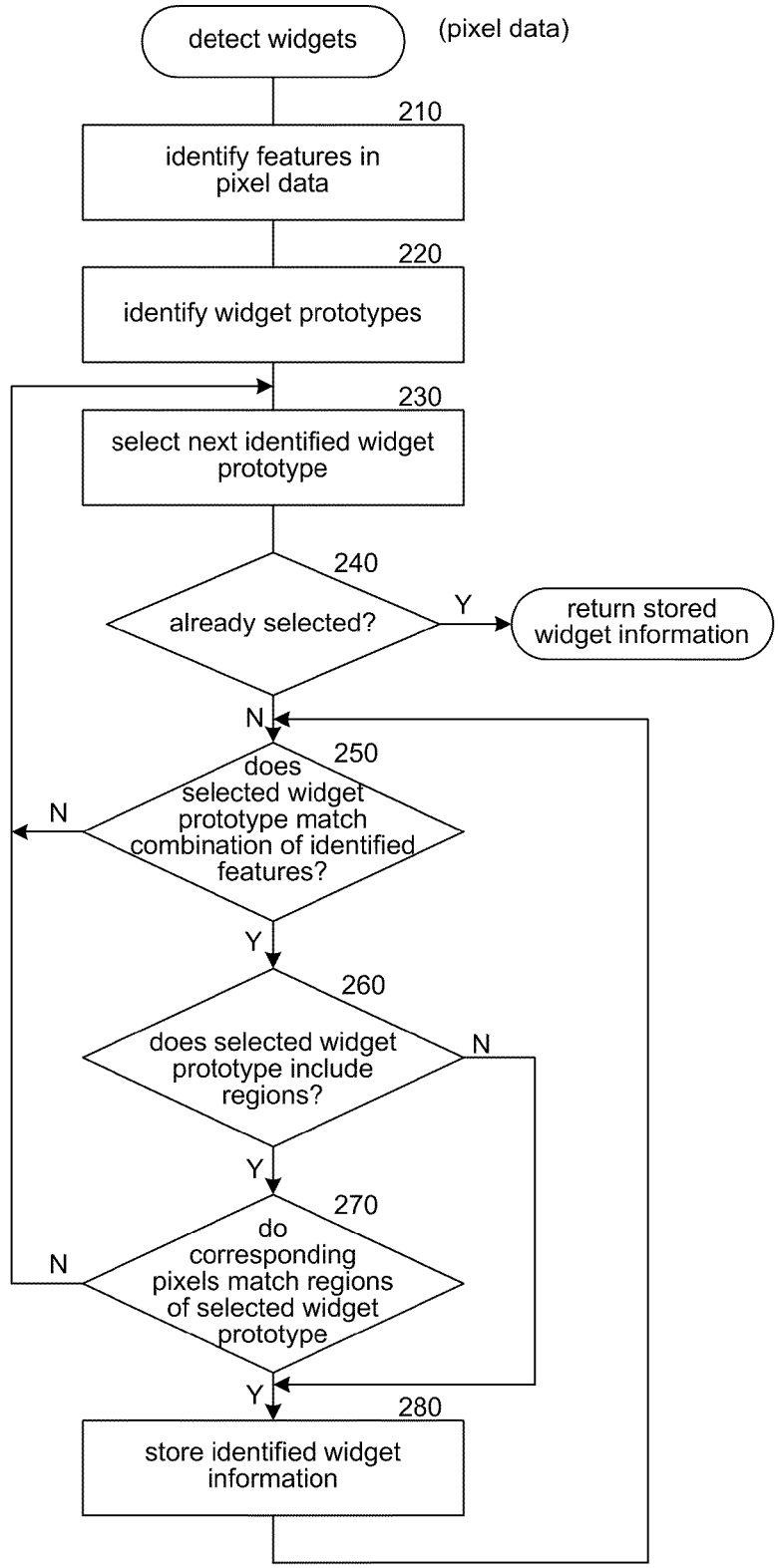
FIG. 2 is a block diagram illustrating the processing of a detect widgets component in some embodiments.
Figure 3:
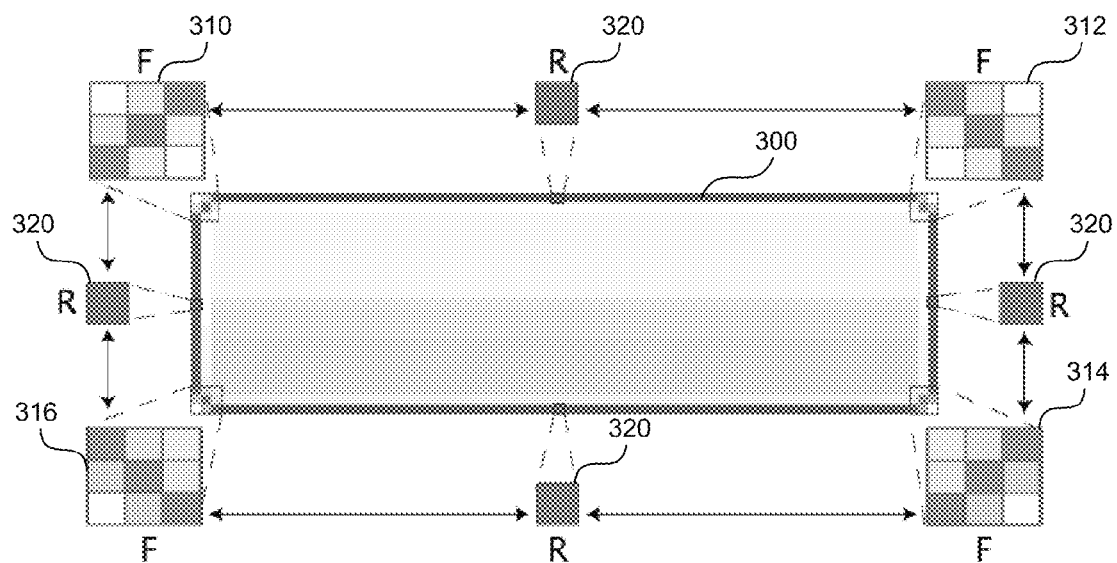
FIG. 3 is a display diagram illustrating a widget prototype for a button widget in some embodiments.

FIG. 2 is a block diagram illustrating the processing of a detect widgets component in some embodiments. The facility invokes the detect widgets component to locate interface widgets within pixel data passed to the component. In block 210, the component identifies features in the pixel data and stores information pertaining to their relative location in the image data. Each feature is an arrangement of at least one pixel. By way of example, FIG. 3 is a display diagram illustrating a widget prototype for a button widget in some embodiments. In this example, the widget prototype includes four features 310, 312, 314, and 316, each feature corresponding to a different corner of button 300 and having a different arrangement of nine pixels. For example, feature 310, which corresponds to the top left corner of button 300, includes a dark pixel at the top right, center, and bottom left positions and a white pixel at the top left position while feature 314, which corresponds to the bottom left corner of button 300, includes a dark pixel at the top right, center, and bottom left positions and a light gray pixel at the top left position. In some examples, a pixel of a feature may be transparent, indicating that the color of that particular pixel is irrelevant to the feature. Thus, the feature can be matched to a corresponding feature in the pixel data regardless of the color of the irrelevant pixels.

Figure 4A:
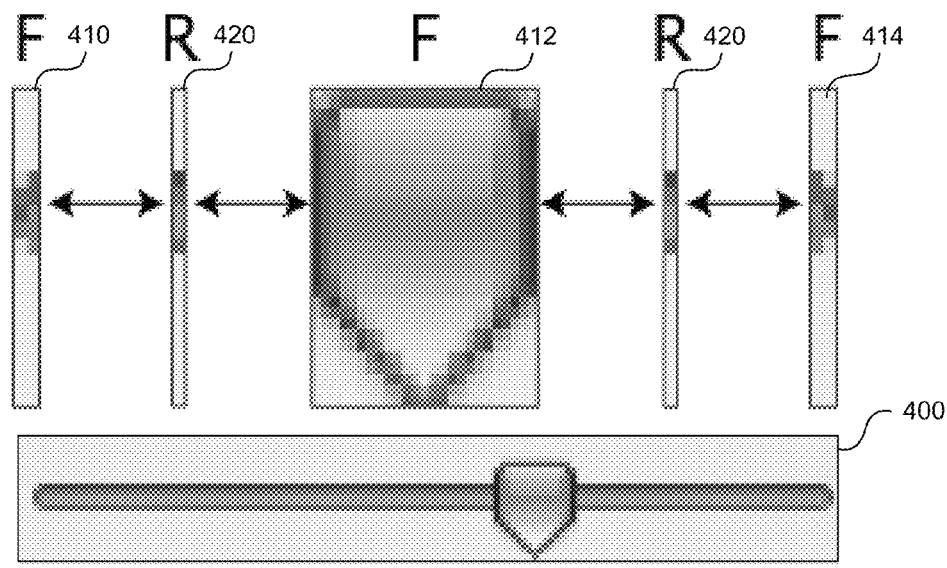
FIG. 4A is a display diagram illustrating a widget prototype for a slider widget in some embodiments.

As another example, FIG. 4A is a display diagram illustrating a widget prototype for a slider widget in some embodiments. In this example, the widget prototype includes three features 410, 412, and 414. Features 410 and 414 correspond to the left end and right end, respectively, of a bar or trough of slider 400. Feature 412 corresponds to a slider thumb of slider 400. Each of regions 420 correspond to repeating patterns of pixels between either end of the bar or trough of slider 400 and the slider thumb, which vary in size as the slider thumb slides either left or right.

Figure 4B:
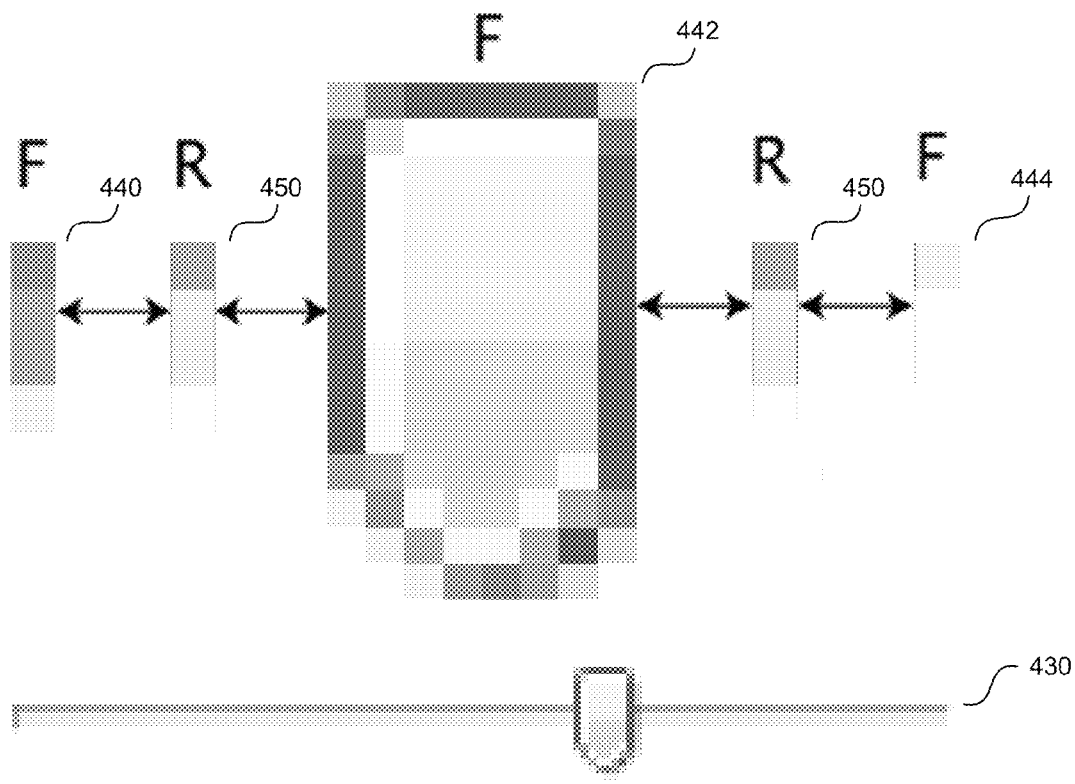
FIG. 4B is a display diagram illustrating a widget prototype for an alternative slider widget in some embodiments.

FIG. 4B is a display diagram illustrating a widget prototype for an alternative slider widget in some embodiments. In this example, the widget prototype includes three features 440, 442, and 444. Features 440 and 444 correspond to the left end and right end, respectively, of a bar or trough of slider 430. Feature 442 corresponds to a slider thumb of slider 430. Each of regions 450 correspond to repeating patterns of pixels between either end of the bar or trough of slider 430 and the slider thumb, which vary in size as the slider thumb slides either left or right. Each of the widget prototypes in FIGS. 4A and 4B may be associated with the same widget model even though the features and the regions of the widget prototype are represented as different combinations of pixels.

In some embodiments, the definitions of the features that the component attempts to detect may be provided to the system or may be generated by analyzing the widget prototypes available within a prototype library and identifying all features of those widget prototypes. The prototype library may be selected, for example, by comparing a sampling of features associated with each library to the captured pixel data, by comparing a color distribution of the captured pixel data to known color distributions for various interfaces, by a user, etc. For each feature to be identified, the component may compare every combination of pixels from the pixel data having the same size as the feature to pixels of the feature to determine whether the feature exists in the pixel data and, if so, where. Alternatively, for each feature to be identified, the component may choose a pixel as a "hotspot" and construct a decision tree for determining whether a collection of pixels in pixel data of an interface match any feature represented in the decision tree by traversing the decision tree using the hotspot as a starting point. Each internal node of the decision tree specifies a horizontal offset and a vertical offset relative to the hotspot, each edge of the decision tree corresponds to the color at that offset, and each leaf of the decision tree corresponds to a feature. Traversal of the decision tree to a leaf tests every pixel in a feature and indicates that the component has detected a feature within the provided pixel data. If an internal node lacks an edge corresponding to the color at the specified offset, then traversal ends and the pixel to which the tree is currently being applied is not the hotspot of any feature. The decision tree can be stored and evaluated against interface pixel data to locate features at runtime. The hotspot for each feature and the offset at each internal node can be chosen arbitrarily. In other words, different decision trees can be constructed for a feature or features from the same arrangement of pixels. In some embodiments, the component may use advanced techniques to choose hotspots to minimize decision tree depth and the length of partial traversals. For example, the component may first test the hotspot then choose the offset for each internal node that maximizes information gain. As another example, when choosing a hotspot for each feature in the prototype library, the component may choose a pixel of a color that is least common among features in the prototype library (using the distribution of colors in the features as a proxy for the distribution of colors in interfaces). Alternatively, the component may detect features in the pixel data by scanning through the pixel data and comparing each combination of pixels in the pixel data to each of the features to be identified. The component may require an exact match between features and pixels in the pixel data or may allow for some differences, such as deviations in pixel color or pixel position.

In block 220, the component identifies widget prototypes that will be used to identify widgets in the pixel data by, for example, identifying the widget prototypes that include any of the identified features in the pixel data. In blocks 230-270, the component loops through each of the identified widget prototypes and compares them to the pixel data to determine whether corresponding widgets exist in the pixel data. In block 230, the component selects the next identified widget prototype. In decision block 240, if the component has already selected the widget prototype, the component returns the stored widget information and completes, else the component continues at block 250. In decision block 250, if the selected widget prototype matches a combination of identified features within the pixel data based on the features of the widget prototype and any constraints of the widget model associated with the selected widget prototype, then the component continues at block 260, else the component loops back to block 230 to select the next identified widget prototype. For example, if the component identifies four corner features corresponding to four different corners of a button but that are not in the shape of rectangle, the component may reject the combination. As another example, if the component identifies a slider thumb feature, a slider trough left end feature, and a slider trough right end feature that are in line, the component may indicate that a slider widget may have been observed.

In decision block 260, if the selected widget prototype contains one or more regions, then the component continues at decision block 270, else the component continues at block 280. In decision block 270, if the corresponding pixels of the pixel data match regions of the selected widget prototype, then the component continues at block 280, else the component loops back to block 230 to select the next identified widget prototype. Each region corresponds to a set of pixels in an area of variable size. For example, while the arrangement of pixels at each corner of a particular type of button may remain relatively constant regardless of the size of the button, the edges of the button may change in length as the size of the button changes. Thus, rather than specifying a separate widget prototype for every button of different sizes, a single widget prototype can specify a region to account for portions of the widget that can vary in size. In some embodiments, each region includes a procedural definition for generating a set of pixels in an area of a variable size (e.g., painting a repeating pixel, a repeating pattern of pixels, or a gradient). By way of example, the widget prototype of FIG. 3 specifies a region 320 for painting each edge of button 300 as a repeating pixel. If, for example, the component identifies four corner features corresponding to four different corners of a button but that do not include a repeating pixel connecting the corner features along each edge, the component may reject the combination. As another example, if the component identifies a slider thumb feature, a slider trough left end feature, and a slider trough right end feature that are in line but does not identify a repeating pattern of pixels between the thumb and the ends of the trough, the component may reject the combination.

In block 270, a widget corresponding to the selected widget prototype has been identified and the component stores information pertaining to the identified widget, such as its type (e.g., slider, button, combo box), style (e.g., MICROSOFT WINDOWS VISTA, SWING, Abstract Windows Toolkit (AWT), MAC OS X), location, state (e.g., currently visible, enabled, disabled), associated metadata (e.g., the number of times a user has clicked on or otherwise interacted with the widget), pixel data, etc. In some embodiments, the component may associate the identified widget with code that can be invoked to interact with the identified widget, such as a function for simulating a user clicking a button, adjusting a slider, etc. The component then loops back to decision block 250 to determine whether the selected widget prototype matches other combinations of identified features. In some embodiments, the component may also store annotations or metadata pertaining to the pixel data as a whole, such as keywords located within the interface that the facility can index and use to search (e.g., searching a video for portions relevant to a particular keyword), the date and time on which the pixel data was analyzed, the name of the user that caused the analysis to be performed, etc.

Figure 5:
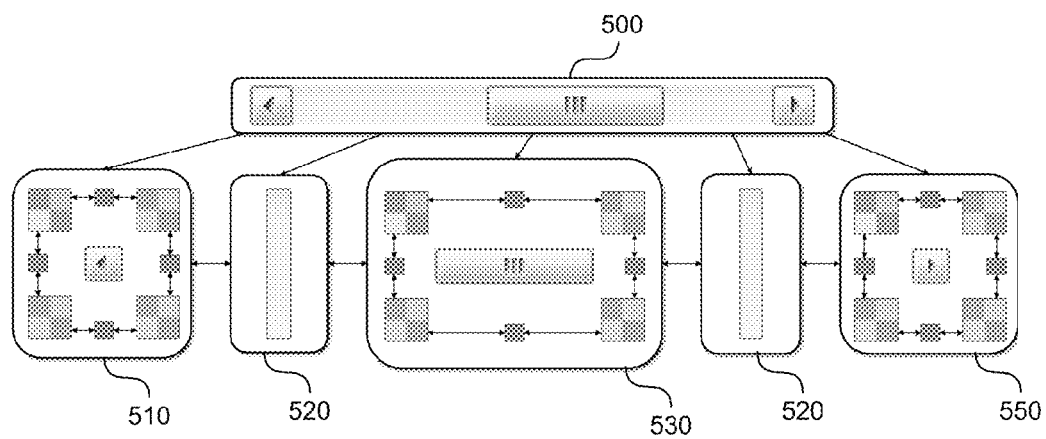
FIG. 5 is a display diagram illustrating a complex or hierarchical widget prototype for a scrollbar widget in some embodiments.

FIG. 5 is a display diagram illustrating a complex or hierarchical widget prototype for a scrollbar widget in some embodiments. In this example, the complex widget prototype includes three widget prototypes 510, 530, and 550 and two regions 520 and 540. Widget prototypes 510 and 550 represent arrow boxes at either end of scrollbar 500. Each of widget prototypes 510 and 550 include four features corresponding to the corners of the arrow boxes and four regions corresponding to the edges of the arrow boxes. Widget prototype 530 represents the bar of scrollbar 500 and includes four features corresponding to the corners of the bar and four regions corresponding to the edges of the bar. Representing the bar via a "widget prototype" allows the facility to use the complex prototype to detect scrollbar widgets having a bar that can vary in size, such as a scrollbar widget that varies the size of its bar to reflect the relative size of the portion of the scrollable area that is currently within view. Each of regions 520 correspond to repeating patterns of pixels between either end of scrollbar 500 and the bar. The facility may detect complex widgets within pixel data by detecting at least one associated non-complex widget, and its associated features, within the pixel data and testing associated model constraints and regions of the complex widget prototype.

Figure 6:
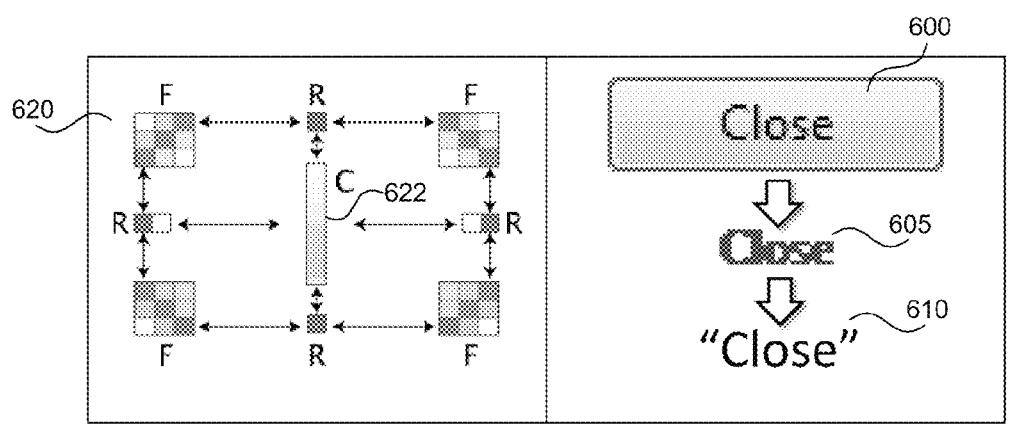
FIG. 6 is a display diagram illustrating the identification of content within an interface widget in some embodiments.

FIG. 6 is a display diagram illustrating the identification of content within an interface widget in some embodiments. In some cases, a widget may include unpredictable or variable content, such as a graphic, an icon, text, etc. For example, a button may include text such as "OK," "Cancel," "Close," etc. Furthermore, a widget may contain another widget that the facility was unable to identify because, for example, the facility was unable to match the pixels associated with the unidentified widget to a widget prototype. The facility can attempt to identify this content through the use of a prototype widget that includes a content region corresponding to the portion of the widget where the unpredictable or unidentified content is likely to occur. In this example, the facility uses prototype widget 620, which includes content region 622, to detect button widgets that include content, such as button 600. As discussed above, button 600 can be detected by identifying features within pixel data and comparing the identified features to features, regions, and associated constraints of widget prototype 620. The content within the button is obtained by, for example, differencing the repeating column of content region 622 against the pixels corresponding to the interior of button 600. In this example, the difference results in pixels 605. The pixels that do not match the content region may be text, an image, another widget, etc. Accordingly, the facility may pass the pixels to a character recognition algorithm to determine whether the pixels contain text or may compare the pixels to available widget models to determine whether the pixels are likely to represent a widget. If the pixels are consistent with a widget model, the facility may generate a widget prototype based on the pixels and the constraints associated with the widget model. In some embodiments, the facility may send the pixels to a server storing a wider collection of widget prototypes and widget models for further analysis. If the facility cannot identify text or a widget within the pixels, the facility may assume that the pixels are an image. In this example, pixels 605 contain text. The facility can pass these pixels to a character recognition algorithm to recover the "Close" text 610 of the content area and cache the results for subsequent use, such as when the facility next detects the widget in captured pixel data so that the component need not repeat content and character recognition.

Figure 7:
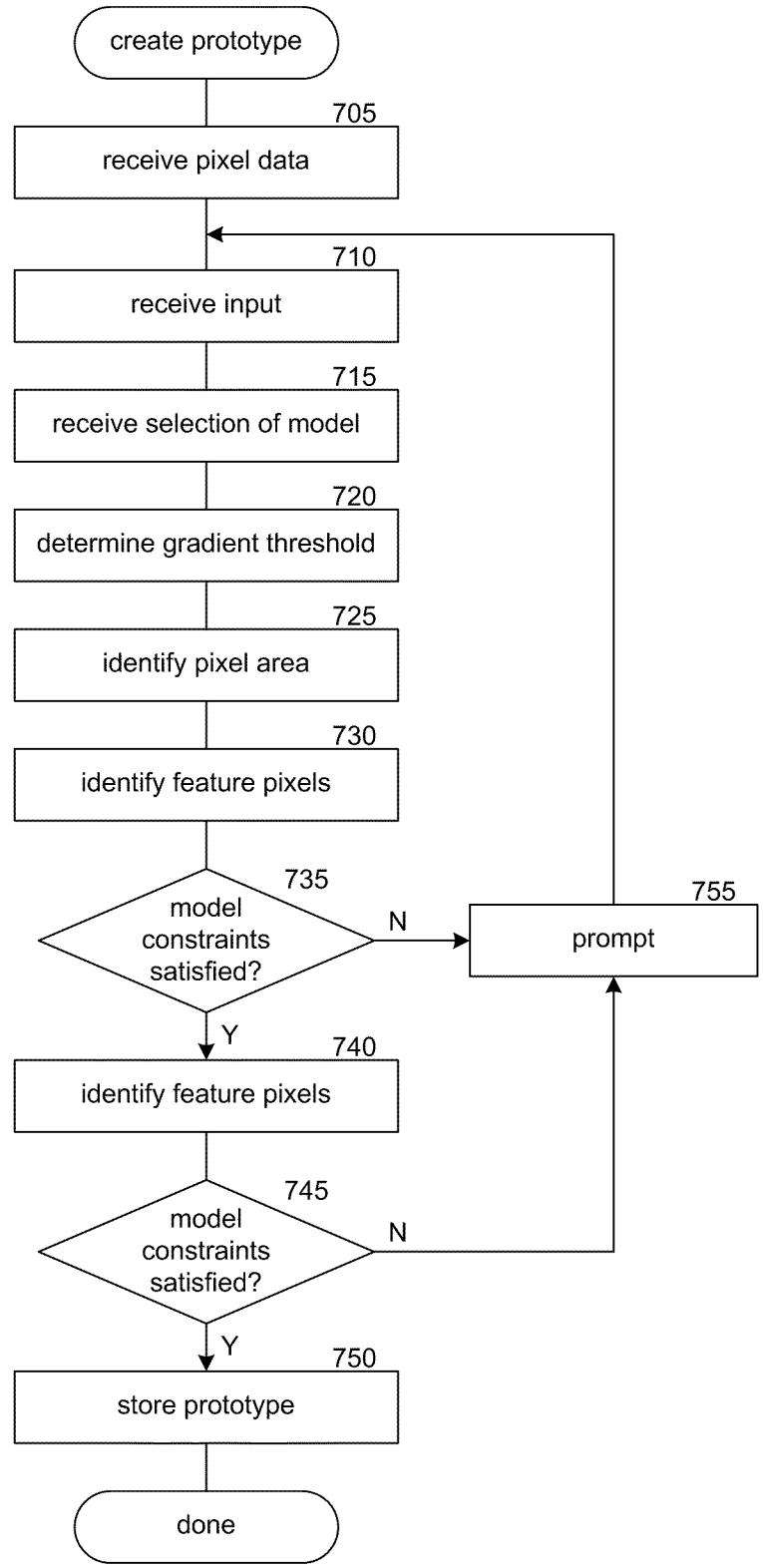
FIG. 7 is a block diagram illustrating the processing of a create prototype component in some embodiments.

FIG. 7 is a block diagram illustrating the processing of a create prototype component in some embodiments. The facility invokes the component to create a widget prototype from pixel data. In block 705, the component receives pixel data corresponding to at least a portion of an interface, such as a screen capture of dialog box provided by the interface. In block 710, the component receives user input corresponding to a widget in the received pixel data. For example, the user may click one or more times within the interior of a widget represented in the pixel data. In block 715, the component receives a selection of a model to associate with the prototype. In block 720, the component determines a gradient threshold used to detect edges of the widget. For example, the component may dynamically generate a gradient threshold by performing an edge detection technique, access a previously stored gradient threshold, or receiving a specified threshold from the user. In block 725, the component identifies an area in the pixel data that includes the received user input (e.g., clicks) and that does not cross pixels where the gradient exceeds the gradient threshold. In some embodiments, rather than identifying a pixel area based on clicks and a gradient threshold, the component may receive sample pixel data directly from a user, such as a selection of pixels specified by drawing a box around the pixels, or use an image segmentation or cut algorithm. The facility may also use negative samples that the facility can use to identify pixels of an interface that should not be matched to a widget prototype.

In block 730, the component identifies, based on the selected model, pixels corresponding to features of the prototype. For example, the model may specify that the prototype include four features, one for each corner and that each of these features should have a height and width of four pixels each. In this example, the component would identify the four-by-four pixel squares at each corner of the identified pixels as corner features of the prototype. As another example, the model may specify that the five rightmost columns of pixels correspond to a feature of the prototype. In some embodiments, pixels of the identified pixel area are assigned to features and regions by a search minimizing the number of pixels to satisfy the associated model.

In decision block 735, if the identified feature pixels satisfy constraints of the selected model, then the component continues at block 740, else the component continues at block 755. For example, the selected model may specify four-by-four pixel blocks for each corner of the prototype and further specify that the corner features must not overlap. If the identified pixel area is fewer than eight pixels in height or width, then the identified pixel area cannot satisfy the model constraints. In block 755, the component prompts the user and then returns to block 705 to receive user input. For example, the component may notify the user of an error, prompt the user to select additional or alternative pixel data from the received pixel data, or to select a different model. In block 740, the component identifies, based on the associated model, pixels corresponding to features of the prototype. For example, the model may specify, for each edge, a repeating pattern of pixels having a width (or height) of two pixels. In this example, the component would identify, for each edge of the prototype, the two-pixel wide (or high) pattern corresponding to each edge using, for example, a branch-and-bound search algorithm. In decision block 745, if the identified region pixels satisfy constraints of the selected model, then the component continues at block 750, else the component continues at block 755. For example, if the selected model specifies that a widget prototype is to have a three-pixel wide repeating pattern from corner to corner on the left and right sides of a widget prototype and the identified pixel area only includes a repeating pattern of two pixels on the left and right sides, the identified pixel area cannot satisfy the model constraints.

Figure 8:
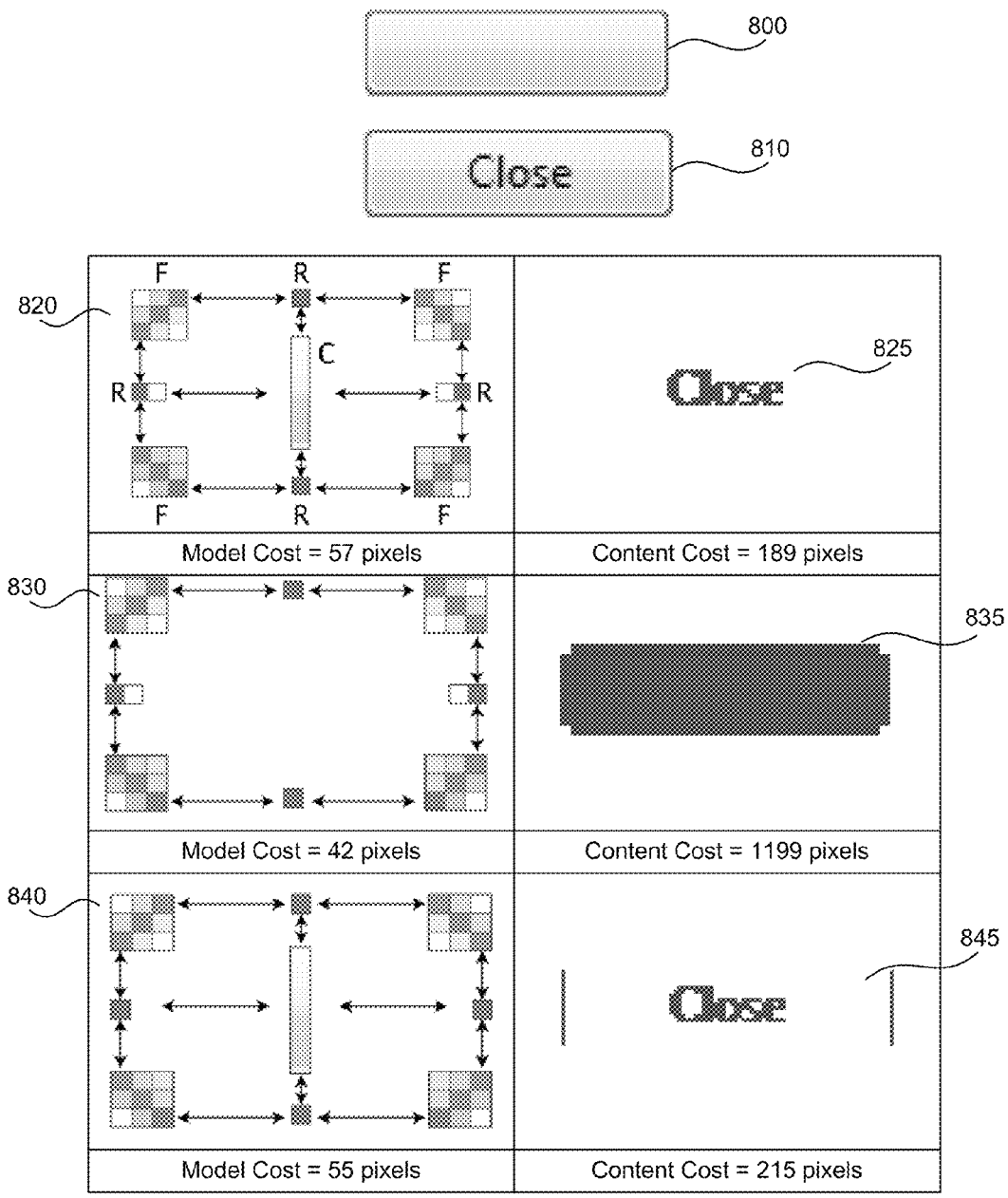
FIG. 8 is a display diagram illustrating costs associated with multiple candidate prototypes for an identified pixel area in some embodiments.

In some examples, the component may match multiple candidate prototypes to an identified pixel area and select a prototype from this set of candidate prototypes based on a cost value associated with each prototype. FIG. 8 is a display diagram illustrating costs associated with multiple candidate prototypes for an identified pixel area in some embodiments. In this example, each of widget prototypes 820, 830, and 840 match pixel area 800, which is representative of a button widget without content. Typically, the component will select the candidate prototype with the lowest model cost, or the fewest pixels used to represent the appearance of the features and regions within the identified pixel area. In this example, the features and regions within candidate prototype 820 include 57 pixels—nine pixels for each of the four corner features, one pixel for the top and bottom edge regions, two pixels for the left and right edge regions, and 15 pixels for the center content region. Accordingly, candidate prototype 820 has a model cost of 57 pixels. Candidate prototype 830 has a model cost of 42 pixels while candidate prototype 840 has a model cost of 55 pixels. Thus, candidate prototype 840 is the candidate prototype with the lowest model cost.

In some embodiments, the component may account for widgets having unpredictable content, such pixel area 810 representative of a button widget with text, using a content cost. The content cost is the number of pixels in the identified pixel area that do not match the candidate prototype. For example, candidate prototype 820 matches pixel area 810 at the corners, along one-pixel wide edges at the top and bottom of the pixel area, along two-pixel wide edges at the left and right sides of the pixel area, and at every location within the pixel area that does not represent text. Thus, the content cost associated with pixel area 810 and candidate prototype 820 is equivalent to the number of pixels representing the text in pixel area 810, or 189 pixels. As another example, candidate prototype 830 matches pixel area 810 at the corners and along each edge but does not match in the interior sections, resulting in a content cost of 1199 pixels. Candidate prototype 840—which is similar to candidate prototype 820 but has one-pixel wide regions on its left and right sides as opposed to the two-pixel wide regions on the left and right sides of candidate prototype 820—does not match the pixels of pixel area 810 that represent text and along one-pixel wide columns on the left and right sides. In some embodiments, the component may select the candidate prototype for a selected pixel area that has the lowest combined model and content cost. In the example of FIG. 8, candidate prototype 820 has the lowest combined cost. Alternatively, the component may use a weighted sum of the model and content costs or may use the model cost and content costs individually or as part of a larger decision process.

In block 750, the component stores the prototype as an arrangement of the identified feature pixels and region pixels and then completes.

In some embodiments, the facility may identify content within the interface that does not match any feature or region of the available widget prototypes. For example, a button may contain unpredictable text or an image that is not represented in a corresponding widget prototype. As another example, a widget may contain another widget associated with a widget prototype to which the facility does not have access. The facility may automatically generate a widget prototype for an unidentified widget by comparing unmatched pixels to available widget models and, upon finding a match, storing the corresponding pixels as features and/or regions of a new widget prototype. In this manner, the facility can dynamically adapt to the presence of new widgets within an interface. Alternatively, the facility may pass the pixels to a computer having a central repository of widget prototypes and widget models for further analysis and feature/region matching.

Figure 9:
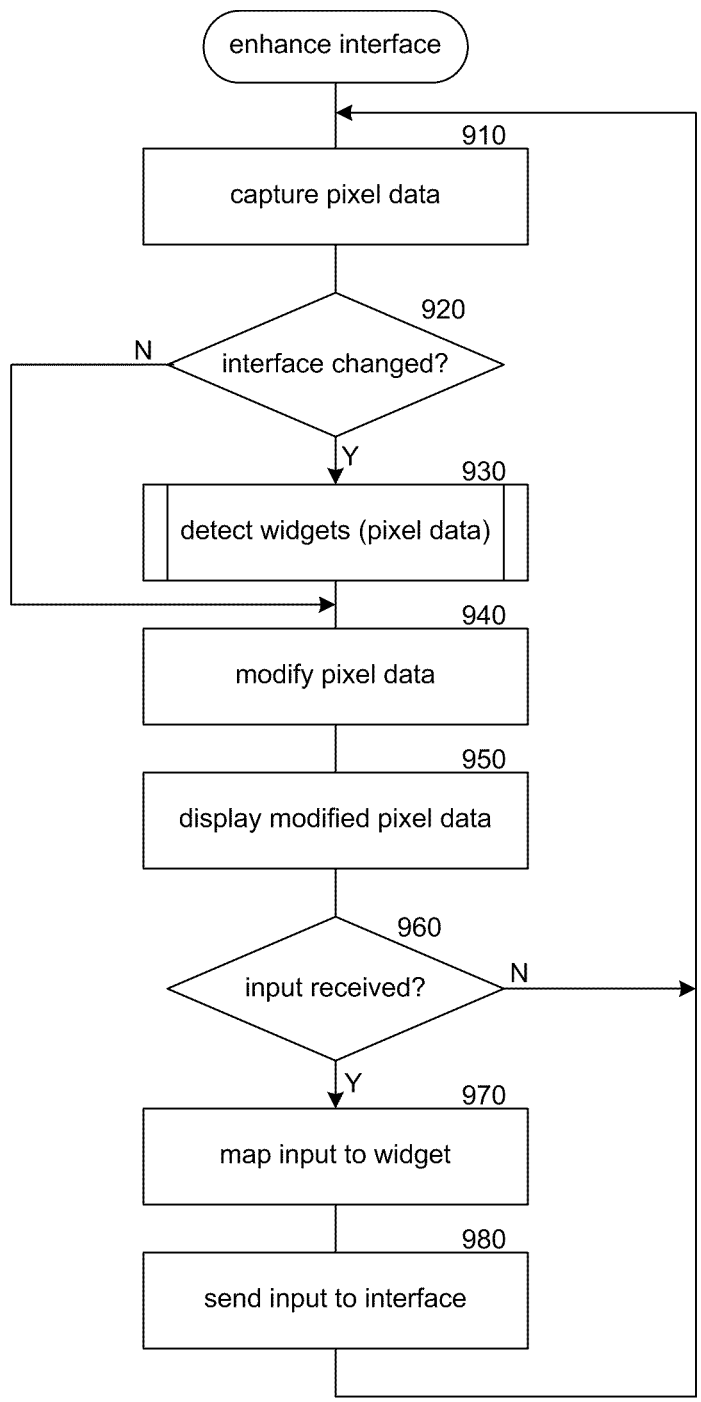
FIG. 9 is a block diagram illustrating the processing of an enhance interface component in some embodiments.

FIG. 9 is a block diagram illustrating the processing of an enhance interface component in some embodiments. The facility invokes the enhance interface component to provide features and functionality to the user that are not otherwise available through the original interface. For example, the enhance interface component may present additional interface widgets to a user, allow a user to customize an interface, present a new function to the user, and so on. In some embodiments, the component may intercept the captured pixel data before the pixel data is displayed and only display an enhanced version of the interface. In some embodiments, the component may display the original interface and the enhanced interface simultaneously or allow the user to toggle between the original interface and the enhanced interface.

In block 910, the component captures pixel data associated with an interface. For example, the component may perform a screen capture of a window or other interface component or may access a buffer storing interface pixel data. In decision block 920, if the interface has not changed since pixel data of the interface was last captured, then the component continues at block 940 to modify pixel data, else the component continues at block 930. In block 930, the component passes the captured pixel data to a detect widgets component to detect the widgets represented in the pixel data. In block 940, the component modifies the pixel data, such as if the interface or some other input to the enhancement has changed. The modifications to the pixel data may represent user customization options (e.g., how widgets are drawn (shape, size, color, position), font preferences, color preferences), security features (e.g., representing widgets as disabled or not rendering the widgets that a user is not permitted to access or adjust and ignoring any user input directed to those widgets), additional interface widgets, and so on. For example, the component may replace all instances of a particular slider, such as slider 400, with pixel data representative of another style of slider, such as such as slider 430, to implement a user's customization preferences. As another example, the component may replace the pixel data corresponding to just the thumb of a slider. Alternatively, the component may replace the slider with an entirely different type of widget, such as a text box widget or spinner widget where a user can enter a value corresponding to a particular slider location. As another example, the component may identify content in one language and modify the corresponding pixel data to represent the content in another language.

In some examples, the component may introduce additional functionality to the interface through the modification of pixel data. For example, the component may add pixel data representative of a "Favorites" tab to a tab widget. Although the "Favorites" tab does not actually exist in the interface, the user perceives the "Favorites" tab when the modified pixel data is displayed. When the user clicks on the pixel data representing the "Favorites" tab, the component can access the interface widgets that the user most commonly uses, or that the user has specified as being his favorite, and add pixel data representing each of these widgets to the pixel data for display. In some cases, the user's favorite widgets may exist in different tabs, dialog boxes, panels, etc. Accordingly, the component may access pixel data for each of these interface elements, which may require manipulation of the underlying interface, capture the appropriate pixel data, and display the pixel data on the "Favorites" tab. This manipulation of the underlying interface to acquire appropriate pixel data may be completely hidden from the user if the underlying interface is hidden from the user in favor of the enhanced interface. In this manner, manipulations of an underlying interface need not be strictly synchronous with the display of an enhanced version of the interface.

As another example, the component can perform several manipulations of widgets within an interface, observe the results of each of these manipulations (or a series of combinations of manipulations) and present an indication of these results to a user for selection. When the user selects an indication, the facility can perform the associated manipulations to place the interface in the desired state. For example, a user may wish to edit a photo in PHOTOSHOP using a mosaic paintbrush but not know which mosaic cell size to use to obtain the desired effect. The facility can manipulate the PHOTOSHOP interface to select mosaic cell sizes of, for example, 5, 8, 13, 15, and 20, perform the mosaic edit operation for each cell size, capture the five resulting images, and present the captured images to the user. Upon selection by a user of one of the images, the facility can manipulate the interface accordingly to produce the desired image. One skilled in the art will appreciate that the component can, based on the captured pixel data of the interface and the detected widgets therein, enhance the interface by modifying corresponding pixel data in any of a number of ways to alter the user's experience.

In block 950, the component displays the modified pixel data. In decision block 960, if the component receives user input, then the component continues at block 970, else the component loops back to block 910 to capture pixel data of the interface, such as the entire interface or the pixels that have changed since the interface was last captured.

In block 970, the component maps the received input to a widget of the interface. For example, the component may determine location coordinates associated with the user input, determine whether a widget is displayed at that location in the enhanced interface and, if so, identify the corresponding widget of the interface. In block 980, the component sends the input to the interface. For example, the component may send an indication of the input (e.g., click, drag, keyboard input) and an indication of the widget to the process providing the interface. As another example, the component may synthetically perform the appropriate action on the interface, such as by causing a slider of the interface to move from one position to another based on user input received at the pixel data corresponding to the slider in the modified pixel data of the enhanced interface or by injecting code into a window associated with the interface to perform a desired action. As another example, the component can manipulate multiple widgets in the interface and represent these changes as a modification to a single widget in the enhanced interface. As another example, the component may automatically manipulate widgets within the interface and observe the effects of these manipulations and present a summary of these observations for the purpose of software testing, scripting support, macro execution, or interface mashup support. For example, the component may manipulate widgets corresponding to contrast and brightness values of an interface provided by image editing software, observe the changes to an image caused by these manipulations, and then display the results to a user for selection. The component then loops back to block 910 to capture pixel data of the interface, such as the entire interface or the pixels that have changed since the interface was last captured.

Figure 10:
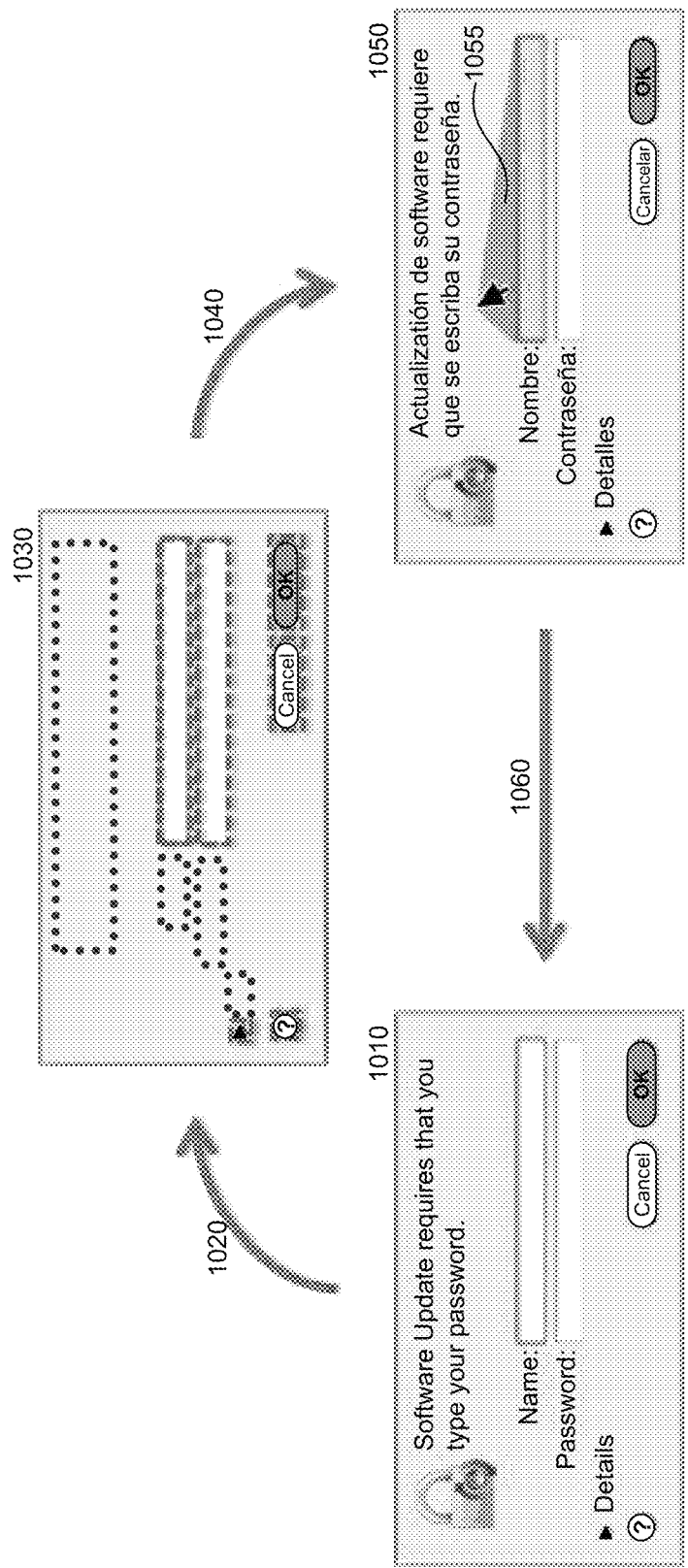
FIG. 10 is a display diagram illustrating stages in the interface enhancement process performed by the enhance interface component in some embodiments.

FIG. 10 is a display diagram illustrating stages in the interface enhancement process performed by the enhance interface component in some embodiments. In this example, an interface is enhanced by translating text content of the interface and further adding a widget targeting functionality to the display. Source window 1010 represents a dialog box of the interface without enhancement. The interface may be provided by an operating system, application, or another process. During transition 1020, the component captures the pixel data of dialog box 1010 and detects widgets within the dialog box. Window 1030 illustrates the detected widgets and content within the dialog box, which include buttons, text, and text boxes. For illustration purposes, the detected widgets are content are highlighted with dashed lines. During transition 1040, the component modifies pixel data associated with the interface. Target window 1050 illustrates the modified pixel data of the dialog box. In this example, the detected text has been translated from English to Spanish and the corresponding pixel data has been modified to reflect the translation. Furthermore, pixel data representing shaded region 1055 has been added to the pixel data of the enhanced interface to highlight a text box widget to the user. Transition 1060 represents the passing of user input to the underlying interface.

Figure 11:
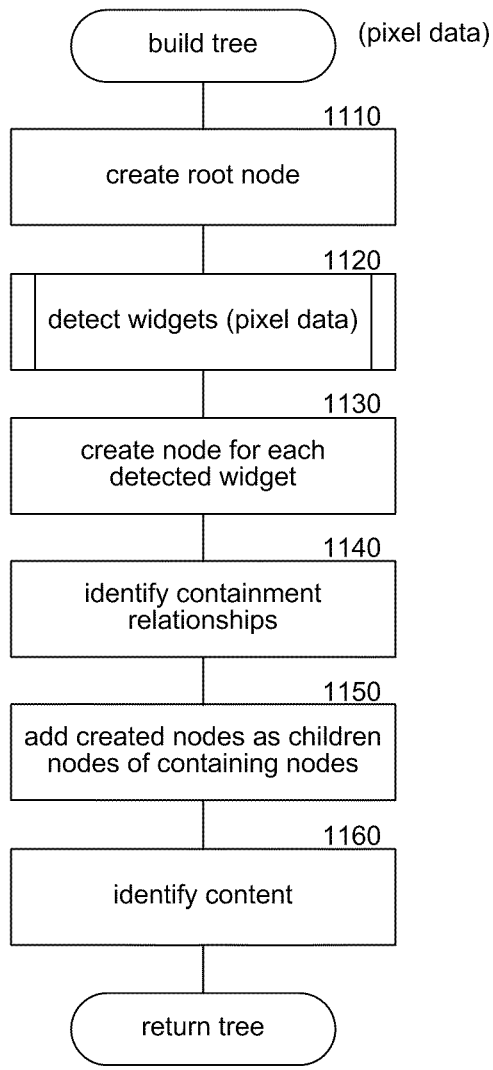
FIG. 11 is a block diagram illustrating the processing of a build tree component in some embodiments.

FIG. 11 is a block diagram illustrating the processing of a build tree component in some embodiments. The facility passes pixel data representative of an interface to the component to construct a tree representative of the hierarchical structure of the widgets and content of the interface without requiring knowledge of the underlying structure or implementation of the interface. In block 1110, the component creates a root node for the pixel data. In block 1120, the component passes the pixel data to a detect widgets component to detect the widgets represented in the pixel data. In block 1130, the component creates a node for each detected widget. In block 1140, the component identifies containment relationships between detected widgets. In some examples, the component may use a gradient threshold to identify edges of different container areas of a widget. As another example, a model or widget prototype used to detect the widget may have an associated function that the component can invoke to obtain parameters defining a container area defined by that widget.

In block 1150, the component adds the created widget nodes as children nodes of containing widget nodes. For example, the component can determine, for each detected widget, which widget contains the detected widget based on the pixels associated with the widgets and add the node for that widget as a child node of the containing widget's node. Widgets can be nested such that a widget is contained by more than one other widget. Accordingly, the component may determine the appropriate structure for nested widgets based on the nesting relationship between the widgets. In some cases, widgets, including floating widgets, may not be contained by another widget. Nodes for these widgets may be added as children nodes of the root node.

In block 1160, the component identifies content within each widget and then completes. In some embodiments, the component identifies content using a post order traversal of the nodes. At each node, the component tests pixels for content by comparing the pixels against a background color or content region associated with a corresponding widget prototype and then marks pixels as tested. Detected content, such as text, and image, an unknown widget, etc., is interpreted and added as a child node of the node at which the content was detected. In some embodiments, the component does not check pixels that are marked as tested at subsequently analyzed nodes in order to avoid content being represented as a child node of multiple nodes. In this manner, each widget and detected content is identifiable via a unique path of nodes. In some embodiments, the component may assign a unique identifier to each node created for the widgets and detected content. Although in this example the relationship between the widgets is described as a tree, one skilled in the art will understand that any data structure can be used to maintain the relationships or hierarchical structure between widgets, such as a graph, list, array, etc. In some embodiments, the component may extract at least a portion of the structure of an interface from an API associated with the interface, such as an accessibility API or a Document Object Model associated with a web page providing an interface.

In some embodiments, a tree associated with an interface may change as a user, or the facility, interacts with the interface. For example, as a user selects different tab panels from a tab widget, a new branch of nodes corresponding to the selected tab panel may be constructed and added to the tree. Alternatively, a tree for the entire interface may be constructed when a new portion of the interface is presented. The new tree and any other previously created trees for the interface can then be merged to form a more detailed tree for the interface. Furthermore, as a user interacts with the interface, widgets and content of the interface may become obscured or occluded. A widget or content may be occluded because, for example, it is currently covered by a modal dialog box, the portion of the interface containing that widget or content has been closed (e.g., a dialog box or window) or hidden from view (e.g., a tab panel of a tab widget that is not currently selected or a widget that has been occluded by a dropdown list). The facility may mark nodes of the tree representing hidden or occluded widgets or content as such so that the facility is aware that those portions of the interface are not currently visible when the facility needs to represent the interface or interact with the interface. In order to access occluded widgets or content, the facility may store navigational commands that the facility can use to reach the occluded widget or content, or cause the occluded widget or content to be displayed, based on, for example, the cause of the occlusion. For example, if a widget is occluded because it is contained by a non-selected tab panel of a tab widget, the facility may force the selection of the appropriate tab panel so that the widget becomes visible. As another example, if content is occluded by a dialog box or dropdown list, the facility may close the occluding dialog box or dropdown list. As another example, the facility may navigate through a series of nested menus to cause the display of a widget contained by an interface widget that is currently closed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the disclosure is not limited except as by the appended claims.

We claim:

1. A method, performed by a computer having a memory and a processor, for interpreting a user interface, the method comprising:

capturing at least a portion of pixel data of a source window associated with the user interface;

with a processor, identifying areas of the captured pixel data that at least substantially match features associated with at least one widget prototype of a prototype library comprising a plurality of widget prototypes, wherein each feature comprises a plurality of pixels; and with a processor, identifying a user interface widget within the captured pixel data at least in part by determining whether a spatial relationship between at least two of the identified areas is consistent with at least one widget prototype of the prototype library, wherein a first widget prototype of the prototype library includes, a plurality of features, wherein the plurality of features is representative of a first type of user interface widget, and at least one constraint on a spatial relationship between at least two features of the first widget prototype, and wherein the identifying the user interface widget within the captured pixel data is based at least in part on:

matching pixels of a plurality of features of the first widget prototype to pixels of the captured pixel data to identify a plurality of features within the captured pixel data corresponding to the user interface widget within the captured pixel data, selecting a first feature of the identified plurality of features within the captured pixel data, selecting a second feature of the identified plurality of features within the captured pixel data, and determining whether the first feature of the identified plurality of features within the captured pixel data and the second feature of the identified plurality of features within the captured pixel data satisfy the at least one constraint of the first widget prototype.

2. The method of claim 1 wherein identifying a user interface widget within the captured pixel data further comprises:

testing the color and arrangement of selected pixels of the captured pixel data other than pixels of the at least two identified areas to determine whether the selected pixels are consistent with at least one widget prototype of the prototype library.

3. The method of claim 2 wherein at least one widget prototype defines an arrangement of features associated with widgets of the user interface.

4. The method of claim 3 wherein at least one widget prototype defines an arrangement of regions relative to features associated with widgets of the user interface, individual regions specifying a repeating pixel, a repeating pattern of pixels, or a gradient.

5. The method of claim 1, further comprising:

altering a portion of the captured pixel data based at least in part on the identified user interface widget; and displaying the altered pixel data to enable modification of apparent contents of the user interface.

6. The method of claim 5, further comprising:

updating contents of the altered pixel data based at least in part on a change to the user interface of the source window.

7. The method of claim 5 wherein the altered pixel data is not displayed at the source window.

8. The method of claim 5, further comprising:

identifying text associated with the identified user interface widget, the identified text being in a first language; and receiving a translation of the identified text in a second language, wherein altering a portion of the captured pixel data includes replacing pixels of the pixel data corresponding to the identified text in the first language with pixels corresponding to the translation of the identified text in the second language.

9. The method of claim 5 wherein altering the portion of the captured pixel data includes representing a new widget within the pixel data that is not represented in the captured pixel data.

10. The method of claim 1, further comprising:

receiving user input;

mapping the received user input to a widget of the user interface of the source window based at least in part on the captured pixel data and the identified user interface widget; and manipulating the user interface of the source window based on the mapped user input to enable modification of the apparent behavior of the user interface.

11. The method of claim 10 wherein the user input is not received at the source window.

12. The method of claim 1, further comprising:

in response to determining that the spatial relationship between the at least two of the identified areas is consistent with a first widget prototype and a second widget prototype, selecting a widget prototype corresponding to the user interface widget at least in part by, determining the number of pixels of the user interface widget that do not match pixels of a content region of the first widget prototype, and determining the number of pixels of the user interface widget that do not match pixels of a content region of the second widget prototype.

13. The method of claim 1, further comprising:

generating input to manipulate the identified user interface widget.

14. The method of claim 13 wherein the generated input is generated in response to user interaction with an indication of the identified user interface widget or data associated with the identified user interface widget.

15. The method of claim 1, wherein the matching comprises exactly matching pixels of the at least one widget prototype to pixels of the captured pixel data.

16. The method of claim 1, further comprising:

creating an adapted interface based at least in part on the first interface and a device on which the adapted interface is to be displayed.

17. The method of claim 1, further comprising:

creating an adapted interface based at least in part on the first interface and configured to remove undesired functionality from the first interface.

18. The method of claim 1, further comprising:

responsive to determining that the first feature of the identified plurality of features within the captured pixel data and the second feature of the identified plurality of features within the captured pixel data satisfy the at least one constraint of the first widget prototype, identifying the first feature of the identified plurality of features within the captured pixel data and the second feature of the identified plurality of features within the captured pixel data as belonging to a user interface widget corresponding to the first widget prototype.

19. The method of claim 1, further comprising:

responsive to determining that the first feature of the identified plurality of features within the captured pixel data and the second feature of the identified plurality of features within the captured pixel data do not satisfy the at least one constraint of the first widget prototype, determining whether the first feature of the identified plurality of features within the captured pixel data and the second feature of the identified plurality of features within the captured pixel data satisfy at least one constraint of a second widget prototype.

20. A computer-readable memory storing instructions that, when executed by a computer, cause the computer to perform steps comprising:
- capturing at least a portion of pixel data of an interface;
- identifying features within the captured pixel data, each identified feature having an arrangement of pixels; and
- identifying at least one interface widget within the captured pixel data at least in part by determining whether a spatial relationship between at least two of the identified features is consistent with at least one widget prototype of a prototype library comprising a plurality of widget prototypes,
  - each widget prototype comprising:
    - a plurality of pixels representative of a type of user interface widget,
    - at least two features, so that each feature of the widget prototype represents less than the entirety of pixels in the widget prototype, and
    - at least one constraint on a spatial relationship between the at least two features of the widget prototype, and
  - wherein the identifying the at least one interface widget within the captured pixel data is based at least in part on matching pixels of a plurality of features of the identified widget prototype to pixels of the captured pixel data of the interface to identify a plurality of features within the captured pixel data.

21. The computer-readable memory of claim 20, the steps further comprising:
- generating at least one widget prototype at least in part by,
  - displaying an image of at least part of the interface,
  - receiving, from a user, an indication of a location corresponding to a widget within the displayed image,
  - identifying, based at least in part on the location, an area of the displayed image corresponding to the widget, and
  - storing at least a portion of the pixels of the identified area as at least part of at least one widget prototype.

22. The computer-readable memory of claim 21 wherein identifying the area of the displayed image corresponding to the widget is based at least in part on a gradient threshold.

23. The computer-readable memory of claim 20, the steps further comprising:
- determining at least one widget prototype at least in part by:
  - receiving a first candidate for the at least one widget prototype;
  - receiving a second candidate for the at least one widget prototype;
  - determining the number of pixels associated with the first candidate;
  - determining the number of pixels associated with the second candidate; and
  - selecting as the at least one widget prototype the first candidate or the second candidate based at least in part on which candidate has the fewest number of associated pixels.

24. The computer-readable memory of claim 20, the steps further comprising:
- constructing a portion of an interface widget hierarchy at least in part by,
  - storing an indication of a first interface widget as a first node of the interface widget hierarchy,
  - identifying, within a portion of the captured pixel data corresponding to the first interface widget, a plurality of second user interface widgets at least in part by comparing pixels of the captured pixel data to widget prototypes selected from the prototype library, and
  - for each identified second user interface widget, storing an indication of the identified second user interface widget as a child node of the first node.

25. The computer-readable memory of claim 20, the steps further comprising:
- receiving image data including a user interface; and
- creating a user interface widget hierarchy for the user interface of the received image data at least in part by,
  - creating a root node for the user interface widget hierarchy,
  - analyzing the received image data to identify each widget of the user interface,
  - creating a node for each identified widget of the user interface, and
  - for each identified widget,
    - in response to determining that the identified widget is contained by at least one widget, adding the node of the identified widget as a child of the node of one widget containing the identified widget, and
    - in response to determining that the identified widget is not contained by a widget, adding the node of the identified widget as a child of the root node.

26. The computer-readable memory of claim 20 wherein the identified at least one user interface widget is one of a button widget, a checkbox widget, a combobox widget, a label widget, a list widget, a menu widget, a progressbar widget, a scrollbar widget, a slider widget, a spinner widget, a split pane widget, a tabbed pane widget, a textfield widget, a tooltip widget, or a tree widget.

27. The computer-readable memory of claim 20, the steps further comprising:
- identifying unpredictable content within the at least one interface widget at least in part by comparing a content region associated with the at least one widget prototype with pixels of the at least one interface widget.

28. The computer-readable memory of claim 27 wherein the unpredictable content is text.

29. The computer-readable memory of claim 20 wherein the interface has an associated application programming interface.

30. The computer-readable memory of claim 29, the steps further comprising:
- retrieving a hierarchical description of widgets of at least a portion of the interface via the associated application programming interface,
- wherein identifying at least one interface widget includes identifying at least one widget not represented in the retrieved hierarchical description.

31. The computer-readable memory of claim 30, further comprising:
- providing an enhanced representation of at least one widget represented in the retrieved hierarchical description or at least one widget not represented in the retrieved hierarchical description.

32. A computing system, having a memory, the computing system comprising:
- a first component configured to identify interface widget features within captured pixel data of a first interface;
- a second component configured to identify, based at least in part on the identified interface widget features, a plurality of widget prototypes of a prototype library comprising a plurality of widget prototypes, each widget prototype of the prototype library comprising:
- a plurality of pixels representative of a type of user interface widget,
- at least two features, so that each feature of the widget prototype represents less than the entirety of pixels in the widget prototype, and
- at least one constraint on a spatial relationship between at least two features of the widget prototype,
- wherein the second component is configured to identify the plurality of widget prototypes based at least in part on matching pixels of a widget prototype to pixels of the captured pixel data of the first interface to identify a plurality of features within the captured pixel data; and a component configured to, in response to detecting a widget within the captured pixel data by comparing at least one of the identified widget prototypes to the captured pixel data, store an indication of the detected widget, wherein at least one of the components comprises computer-executable instructions stored in the memory for execution by the computing system.

33. The computing system of claim 32 wherein the prototype library includes at least one widget prototype associated with each of a plurality of types of user interface widgets in one or more configurations.

34. The computing system of claim 33 wherein the types of user interface widgets include at least one of a button widget, a checkbox widget, a combobox widget, a label widget, a list widget, a menu widget, a progressbar widget, a scrollbar widget, a slider widget, a spinner widget, a split pane widget, a tabbed pane widget, a textfield widget, a tooltip widget, or a tree widget.

35. The computing system of claim 32 wherein the stored indication of the detected widget includes a widget type, a widget style, pixel data corresponding to the detected widget, and a location relative to the captured pixel data.

36. The computing system of claim 32 further comprising:
a component configured to identify unpredictable content within the detected widget at least in part by comparing pixels of the detected widget with a background region associated with the detected widget.

37. The computing system of claim 36 wherein the unpredictable content is an image.

38. The computing system of claim 32, further comprising:
a component configured to create an adapted interface based at least in part on the first interface and preferences of a user.

39. The computing system of claim 38 wherein the adapted interface is further based on the device on which the adapted interface is to be displayed.

40. The computing system of claim 38 wherein the adapted interface is adapted to provide at least one of improved accessibility, translation, localization, or security restrictions.

41. The computing system of claim 38 wherein the adapted interface is adapted to remove undesired functionality.

42. The computing system of claim 32 wherein the pixel data is captured from an archive of images.

43. The computing system of claim 42 wherein the archive is video data of the interface.

44. The computing system of claim 42, further comprising:
a component configured to associate metadata with at least one image of the archive.

45. The computing system of claim 42, further comprising:
a component configured to modify contents of at least one image of the archive.

46. The computing system of claim 45 wherein the component configured to modify contents of the at least one image is configured to crop the at least one image.

47. The computing system of claim 32, wherein a first widget prototype represents a button user interface widget, wherein a first feature of the first widget prototype represents pixels of a first corner of the button user interface widget, wherein a second feature of the first widget prototype represents pixels of a second corner of the button user interface widget, wherein a third feature of the first widget prototype represents pixels of a third corner of the button user interface widget, and wherein a fourth feature of the first widget prototype represents pixels of a fourth corner of the button user interface widget.

* * * * *

UNITED STATES PATENT AND TRADEMARK OFFICE
CERTIFICATE OF CORRECTION

| | |
|---|---|
| PATENT NO. | : 9,182,981 B2 |
| APPLICATION NO. | : 12/953257 |
| DATED | : November 10, 2015 |
| INVENTOR(S) | : James Fogarty |

It is certified that error appears in the above-identified patent and that said Letters Patent is hereby corrected as shown below:

On the Title page, in item (56), in column 2, under "Other Publications", line 1, Delete "Ripiing" and insert -- Ripping --, therefor.

On page 2, in column 1, under "Other Publications", line 1, Delete "Revese" and insert -- Reverse --, therefor.

Signed and Sealed this
Fifteenth Day of March, 2016

Michelle K. Lee
*Director of the United States Patent and Trademark Office*